United States Patent [19]

Boosalis et al.

[11] 4,034,661
[45] July 12, 1977

[54] APPARATUS FOR HEATING AND DISPENSING FOOD ARTICLES

[75] Inventors: Michael G. Boosalis, Fayetteville; Thomas D. Wason, Raleigh, both of N.C.

[73] Assignee: Michael Boosalis, N.C.

[21] Appl. No.: 693,978

[22] Filed: June 8, 1976

[51] Int. Cl.² .................................... A47J 37/04
[52] U.S. Cl. ............................. 99/339; 99/341; 99/420; 99/427; 99/441; 99/446; 221/150 A
[58] Field of Search ........... 99/339, 341, 440, 427, 99/446, 421 R, 421 P, 421 H, 443 C, 448, 357, 420; 221/150 A

[56] References Cited

U.S. PATENT DOCUMENTS

| 1,971,012 | 8/1934 | MacDonald | 99/339 |
|---|---|---|---|
| 2,142,390 | 1/1939 | Zerr | 99/420 |
| 2,244,670 | 6/1941 | Benedict | 99/339 |
| 2,333,175 | 11/1943 | Henley | 99/339 |
| 2,649,852 | 8/1953 | McCandless | 99/339 |
| 2,775,189 | 12/1956 | Scholl | 99/427 |
| 2,841,074 | 7/1958 | Schechter | 99/357 |
| 2,858,763 | 11/1958 | Bloom | 99/427 |
| 3,273,489 | 9/1966 | Wilson | 99/339 |
| 3,391,633 | 7/1968 | Boosalis | 99/341 |
| 3,734,740 | 5/1973 | Zenos | 99/339 |

*Primary Examiner*—Billy J. Wilhite

[57] ABSTRACT

Apparatus for heating and dispensing skewer-supported food articles such as hotdogs and the like, preferably along with buns therefor including a housing means having feed and discharge openings for the skewer-supported food articles and the buns, magazine means for feeding each of the food articles, conveyor means defining an elongated path of travel and adapted to pick up skewer-supported food articles and buns from the feed openings, carrying them over the path of travel during which time they are heated, and dispensing them through the discharge openings. The skewer-supported food articles are rotated during their travel so that one end of the skewers are gripped for rotation as they are picked up. Stop means are provided on each magazine to enable feeding of the food articles either one at a time or continuously.

24 Claims, 14 Drawing Figures

FIG. 1

APPARATUS FOR HEATING AND DISPENSING FOOD ARTICLES

This invention relates to apparatus for heating and dispensing food articles and relates more particularly to an apparatus adapted to heat elongated skewer-supported food articles, preferably simultaneously with buns therefor.

The skewer-supported food articles may take a variety of forms. For example, such articles could be hotdogs or other sausage-type items having an elongated skewer passed axially therethrough. Alternatively, the device of this invention could be utilized in conjunction with skewers carrying a multiplicity of smaller food items on each skewer such as meatballs or even a variety of individual food articles on a single skewer such as in cooking shish kabobs. For simplicity, reference may be made throughout the instant specification to heating of hotdogs, but it is to be understood that the instant concepts are equally related to the production of any food articles that can be readily supported on a skewer or the like.

Although the instant inventive concepts are primary directed to the provision of the means for heating and dispensing skewer-supported food articles, since such goods are commonly eaten in association with a bun or roll, according to a preferred embodiment thereof, the apparatus includes means for heating and dispensing the buns simultaneously with the skewer-supported food articles.

Devices for heating food articles, primarily for commercial consumption, are well known, but prior art devices have been extremely complex, difficult to maintain and hard to keep clean. Moreover, many prior art devices do not enable the food articles to be rotated during the heating operation so that it is difficult to insure uniform and adequate heating or cooking in a relatively short time.

It is a primary object of this invention to provide an apparatus for heating and dispensing food articles which is relatively simple and inexpensive to manufacture and maintain, easily cleaned and highly efficient in operation.

A further object of this invention is the provision of a device of the type described which picks up skewer-supported food articles such as hotdogs or the like, and, preferably, simultaneously picks up buns therefor, from magazines which are adapted to feed the food articles either one at a time or substantially continuously depending upon the circumstances.

Still another object of this invention is the provision of an apparatus for heating and dispensing skewer-supported food articles wherein the skewers are picked up by a continuous conveyor means and gripped at one end so as to rotate the skewer-supported food articles as they pass along a heating path including means for heating and/or cooking the articles uniformly throughout.

A further object of this invention is the provision of a device designed such that the skewers are easily picked up from the magazine, carried upwardly and then downwardly for heating of the food articles, and then released for dispensing the heated food articles from the device.

Still another object of this invention is the provision of a unique skewer support means comprising pairs of skewer support members, one of which has a bearing means for rotatably supporting one end of the skewer and the other of which has a gripping means for rotating the skewer, with each skewer support member having portions for picking up the skewers as the conveyor mean passes the feed opening, with cams being provided to push one end of the skewer into gripping relationship and for subsequently pushing that end of the skewer out of gripping relationship after the food article has been heated in order to discharge the same.

A still further object of this invention is the provision of a unique device for picking up and supporting a bun or roll, carrying the same along an elongated heating path and then dispensing the heated bun through a discharge opening.

A still further object of this invention is the provision of such a bun support means having leading support portions for picking up the bun from a magazine and carrying it vertically upwardly during the initial part of the heating path, and second support portions for receiving buns dropping from the first support portion of the next succeeding bun support means as the support means travel downwardly toward the discharge opening, and then for discharging the heated buns prior to returning to pick up additional buns.

Other and further objects reside in the combination of elements, arrangement of parts and features of construction. Still other objects will in part be obvious and in part be pointed out in the following detailed description of preferred embodiments of this invention which refer to the accompanying drawings wherein:

Like reference characters refer to like parts throughout the several views of the drawings.

Figure 1:
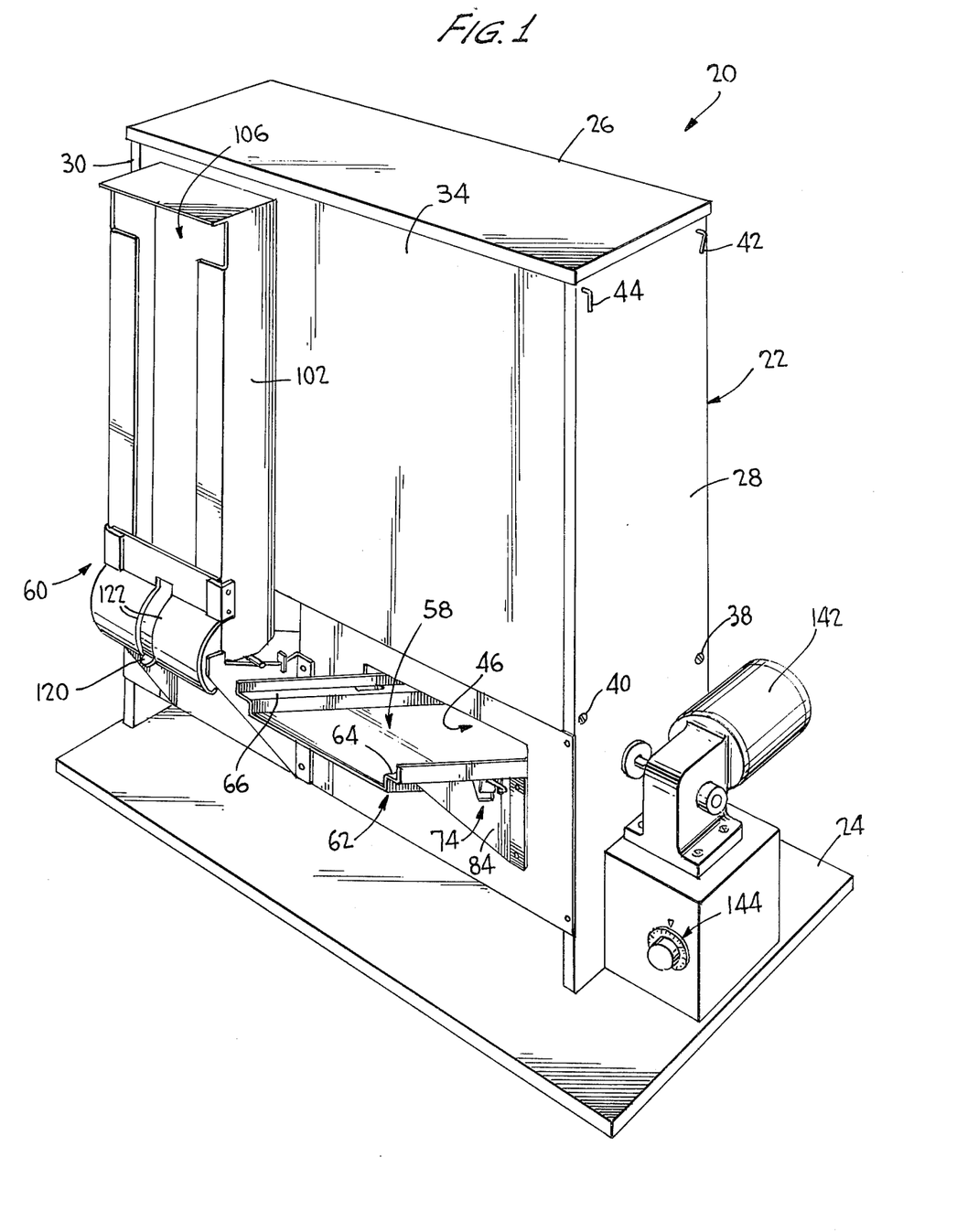
FIG. 1 is a perspective view of an apparatus for heating and dispensing food articles according to a preferred embodiment of the instant inventive concepts.
Figure 2:
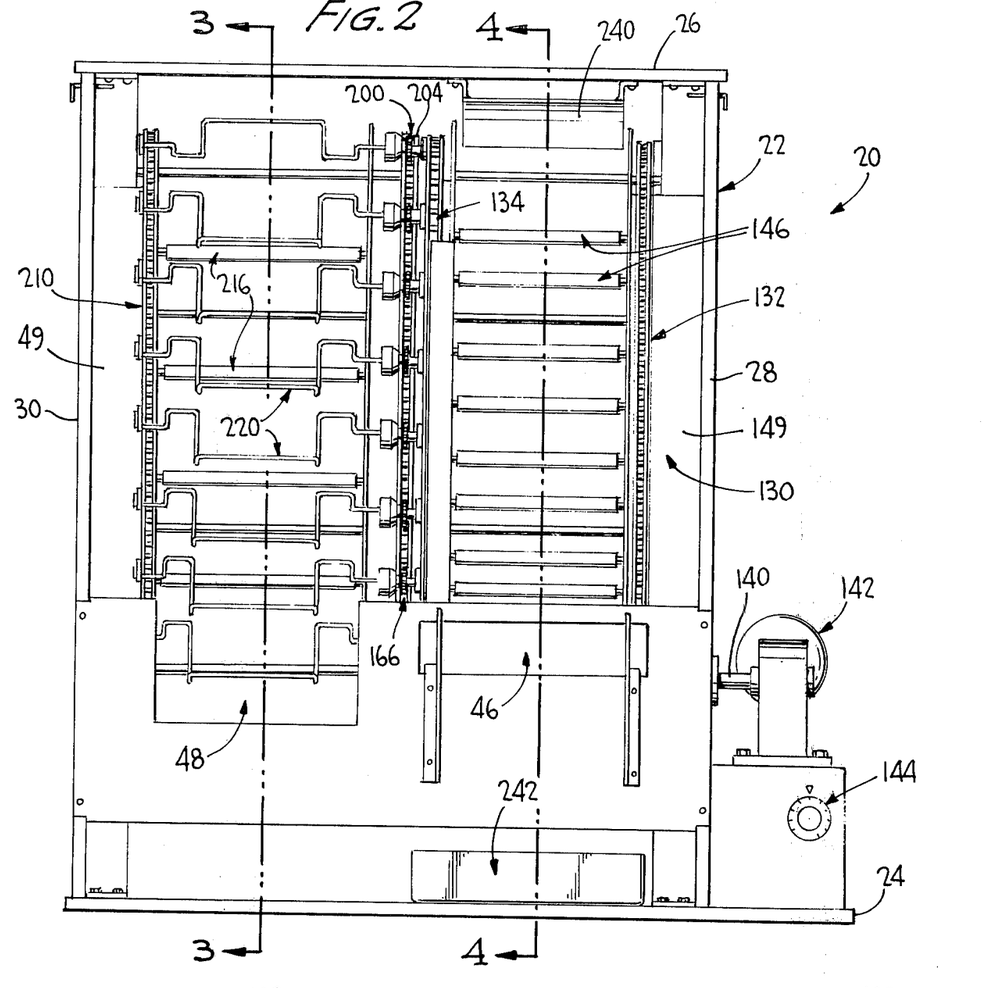
FIG. 2 is a rear elevational view of such apparatus with the magazine means and the rear cover removed for illustrative clarity.
Figure 3:
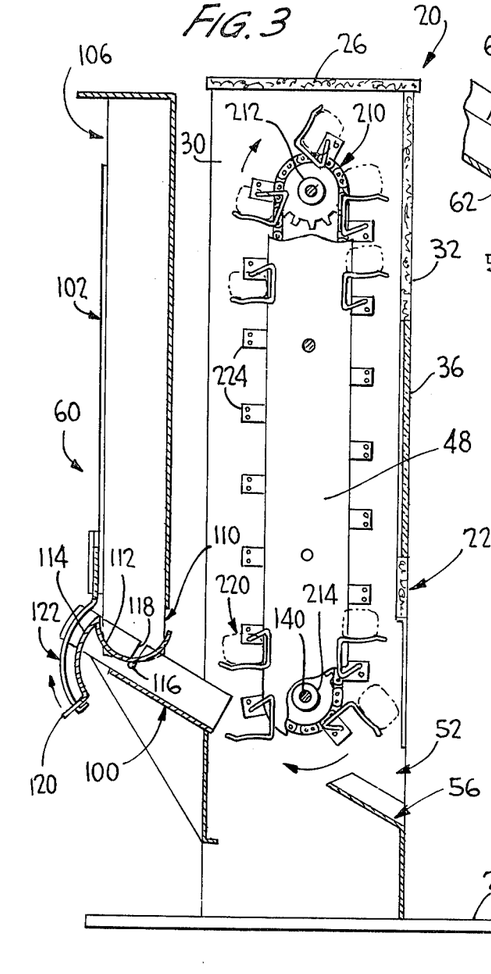
FIG. 3 is a vertical cross-sectional view taken substantially along lines 3—3 of FIG. 2, with the bun magazine means included.

Referring now to the drawings in general, an apparatus for heating and dispensing food articles according to preferred embodiments of the instant inventive concepts is designated generally by the reference numeral 20. Although the preferred embodiment incorporates a section shown in the right hand portion of FIG. 2 for heating and dispensing skewer-supported food articles such as hotdogs or the like and a section shown in the left hand portion of FIG. 2 for heating and dispensing food articles such as hotdog buns, it is to be readily understood that each of these sections could be utilized separately in accordance with the broader concepts of this invention. However, since the combined apparatus is most desirable for many commercial operations, the device will be described as it is shown in the preferred embodiments wherein it incorporates both sections.

The apparatus 20 comprises a housing means 22 which may include a base 24, a top 26, opposite sides 28, 30 and front and back cover 32, 34, each of which may be insulated if desired to reduce heat transfer, with the front cover 32 preferably having transparent portions 36 so that the operation of the apparatus may be viewed from the front. Each of the covers 32, 34 is preferably pivotally supported at their lower ends such as by screws or the like 38, 40 with pins 42, 44 being removably carried at the upper ends to permit the covers to be pivoted outwardly or even removed for maintenance of the internal portions of the apparatus 20.

The housing means 22, in the combined embodiment shown in the drawings, includes portions defining feed openings 46, 48 for reception, respectively, of the skewer-supported food articles and the buns, and further portions defining discharge openings 50, 52 through which these food articles are respectively dispensed. Trays such as shown at 54, 56 may be provided at the discharge openings for receiving the heated food articles as they are dispensed and carrying them through the discharge openings.

Magazine means 58, 60 are provided for storing a multiplicity of skewer-supported food articles and buns therefor, respectively and for feeding such food articles into the respective feed openings 46, 48.

The skewer-supported food article magazine means 58 may comprise a tray means 62 which may be removably carried by the housing means 22 to extend upwardly and outwardly therefrom as will be seen particularly in FIGS. 1, 4 and 9-11. The tray means 62 includes a pair of spaced support portions 64, 66 for carrying the opposite ends of the skewers, one of which is shown at 68 in FIG. 5 as carrying an elongated food article such as a hotdog shown in dotted line at 70. The support portions 64, 66 extend through the feed opening 46 and terminate in upwardly extending flange members 72 adapted to stop the ends of a skewer 68 and support same in a position to be picked up as will be described in more detail hereinafter.

Thus, if a plurality of skewer-supported food articles are positioned on the tray means 62, they will be continuously fed by gravity along the inclined path of the support portions 64, 66 toward the flange members 72. Since it is sometimes desirable to feed the food articles selectively, stop means 74 are preferably associated with each of the support portions 64, 66. The operation of one of the stop means 74 is shown in detail in FIGS. 9-11, it being understood that the other stop means functions in a similar manner and is simultaneously operated by laterally extending tie-bar means (not shown in detail). Each stop means 74 comprises a pivotally supported element 76 having first and second stop members 78, 80 thereon selectively extendable through stop opening 82 in the support portions 64, 66.

Figures 9, 10, 11:
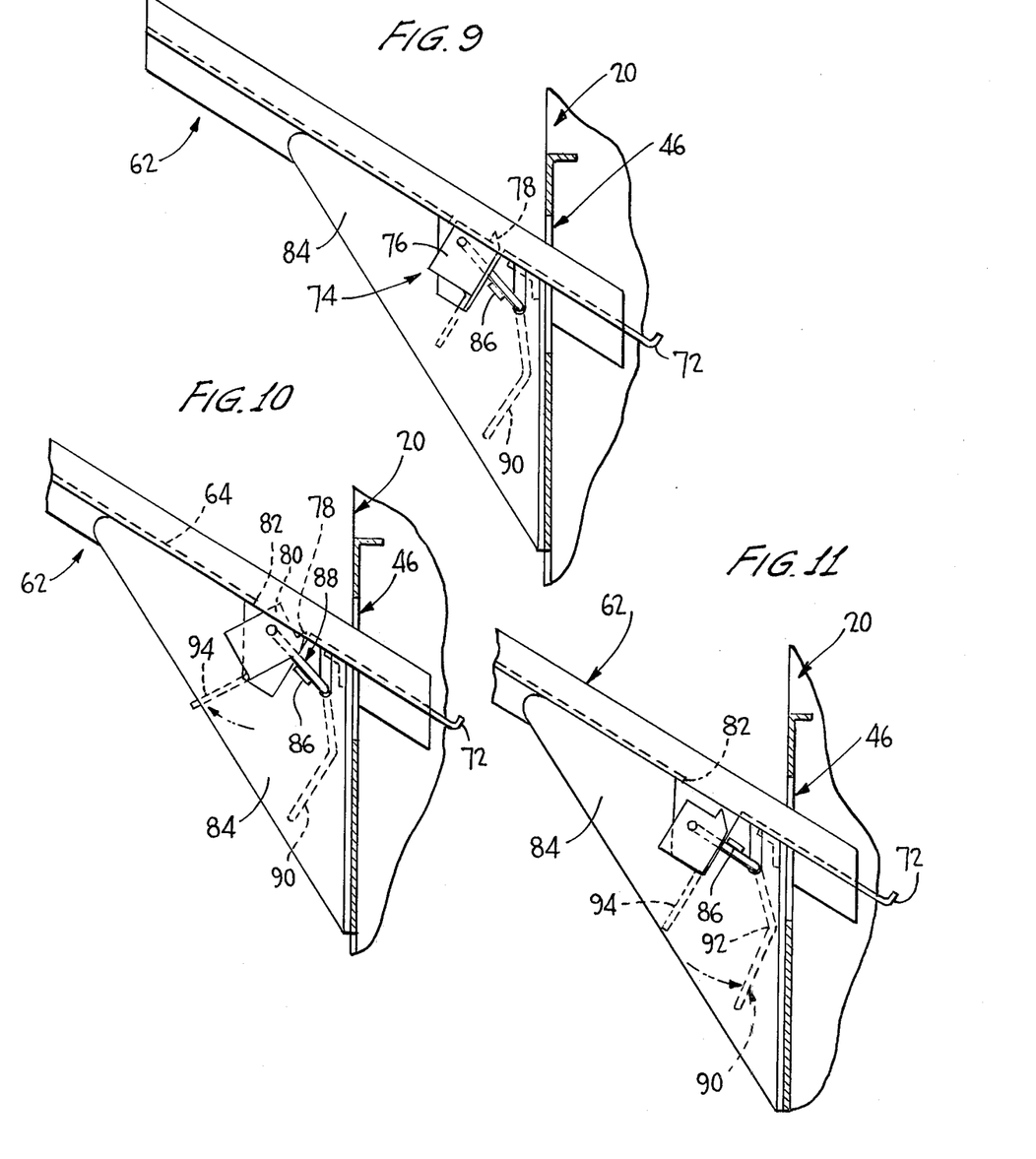
FIGS. 9, 10 and 11 show the various positions of the stop means associated with the skewer-supported food article magazine means.
Figure 12:
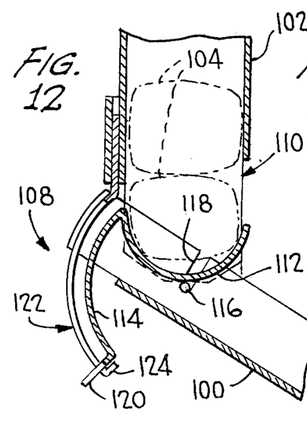
FIGS. 12, 13 and 14 show the various positions of the stop means associated with the bun magazine means.

Angular braces 84 are provided to support the tray means 62, at least one of which includes a small protuberance 86 for supporting a stop operating means 88 in the position of the stop means 74 shown in FIGS. 9 and 10. However, by pressure of a first operating lever 90 in the direction of the arrow shown in FIG. 11 the stop operating means 88, which is resilient, can override the protuberance 86 and completely withdraw the element 76 to the position shown in FIG. 11 wherein neither of the stop members 78 or 80 extend through the stop opening 82 so that the food articles are continuously fed by gravity toward the flange members 72. In this completely withdrawn position of the stop means 74, the element 76 is supported from further downward movement by the angular portion 92 of the first operating lever 90 bearing against a portion of the housing means 22 as shown in FIG. 11.

When it is desired to utilize the stop means 74, the first operating lever means 90 can be pushed upwardly to engage the stop operating means 88 above the protuberance 86 in the manner shown in FIGS. 9 and 10. In the position shown in FIG. 9, the first stop member 78 extends through the stop opening 82 and temporarily prevents additional skewer-supported food articles from sliding along the support portions 64, 66 toward the flange members 72. When it is desired to feed a single additional skewer-supported food article, the element 76 can be rotated to the position shown in FIG. 10 by clockwise movement of the second operating lever means 94 in the direction of the arrow shown in FIG. 10 to thereby withdrawn the first stop member 78 through the stop opening 82 and extend the second stop member 80 through the stop opening 82 at a point just behind the first stop member 78 thereby temporarily precluding further skewer-supported food articles from sliding downwardly along the support portions 64, 66 as one skewer-supported food article is released. Counter-clockwise rotation of the second operating lever means 94 withdraws the second stop member 80 and extends the first stop member 78 in an obvious manner. Operation of the second operating lever means 94 automatically to selectively feed skewer-supported food articles along the support portions 64, 66 of the tray mean 62 synchronously with the conveyor means to be described in more detail hereinafter can be accomplished by any conventional means (not shown).

Figures 13, 14:
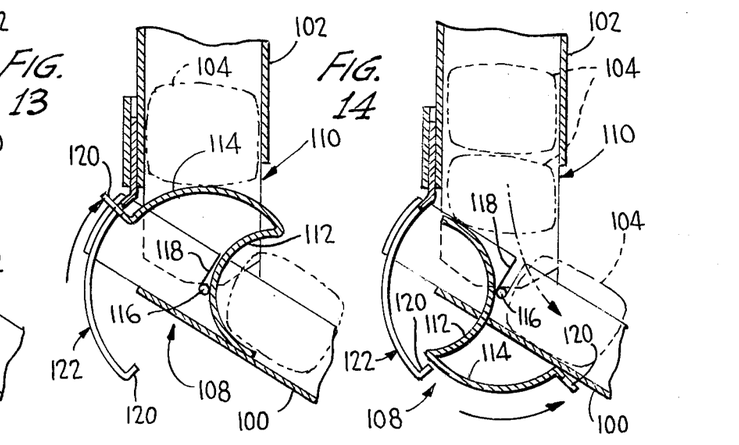

Operation of the bun magazine means 60 will be more readily understood with reference particularly to FIGS. 1, 3 and 12-14. The bun magazine mean 60 preferably comprises an upwardly and outwardly extending tray means 100, the lower end of which communicates with the bun feed opening 48 in the housing means 22. An elongated vertically extending magazine member 102 adapted to receive and store a plurality of buns, one of which is shown in dotted lines at 104 in FIG. 5, through an opening 106 is preferably removably secured to the upper end portion of the bun tray means 100 in any conventional manner. Bun stop means designated generally by the reference numeral 108 are preferably interposed between the lower end of the bun magazine member 102 and the upper end of the bun tray member 100 in the manner shown in detail in FIGS. 12-14. With the bun stop means 108 in the position shown in FIG. 14 the buns 104 can continuously drop by gravity through the opening 110 at the lower end of the bun magazine member 102 onto the bun tray means 100. The bun stop means 108 includes first and second bun stop portions 112, 114 and is rotatably carried by a hinge member 116 secured to the bottom of the first bun stop portion 112, the end of the hinge member 116 being carried in slots 118 defined in the bun tray means 100. A bun operating lever means 120 is secured to one end of the second bun stop portion 114 and is movable between the opposite extremes shown in FIGS. 12 and 13, with guide means 122 being carried by the bun magazine member 102 to enable the bun operating lever means 120 to be smoothly rotated in the direction of the arrow shown in FIG. 13. With the bun stop mean 108 in the position shown in FIG. 12, additional buns 104 are retained within the bun magazine member 102. When the bun operating lever means 120 is rotated upwardly as shown in FIG. 13, the first bun stop portion 112 releases a single bun onto the bun tray means 100 and the second bun stop portion 114 precludes the next succeeding bun from passing onto the bun tray means 100.

The flange means 124 on the bottom of the guide means 122 limits the downward movement of the bun stop means 108, although the bun stop means can be pressed toward the housing means 22 to override the flanges 124 in the manner shown in FIG. 14, thereby rendering the bun stop means 108 inoperative.

Movement of the bun operating lever means 120 can be automatically sychronized to the operation of the bun conveyor mean to be described in more detail hereinafter and, additionally can be synchronously operated with the second operating lever means 94 of the skewer-supported food article stop mean 74 in any conventional manner as would be obvious to those skilled in the art.

Interiorly of the housing means 22 means will be found for picking up skewer-supported food articles and buns dispensed from the respective magazines to the feed openings and carrying these food articles past means adapted to cook, toast, broil, rotisserie or otherwise heat the food articles prior to delivering same to the discharge openings. Specifically, within the housing means 22 will be found skewer-supported food article conveyor means 130 comprising a pair of continuous conveyor chain members 132, 134 with upper and lower sprocket means 136, 138 supporting each chain member, the lower sprocket means 138 being driven by drive shaft 140 associated with motor means 142, preferably having variable speed control means 144 (note particularly FIGS. 1 and 2). The conveyor chain members 132, 134 define a vertically elongated loop including an elongated upwardly extending section immediately following passage of feed opening 46, an elongated downwardly extending section leading past the discharge opening 50, and upper and lower arcuate connecting sections. Heating means 146, preferably in the form of a plurality of vertically spaced infrared heating members of any conventional form, are juxtaposed to the upwardly and downwardly extending sections of the conveyor chain members 132, 134 within the path of travel defined thereby. The heating means 146 may be operatively connected in any conventional manner to a source of electrical energy and, preferably these members may be readily removed for replacement as necessary.

Figures 5, 6:
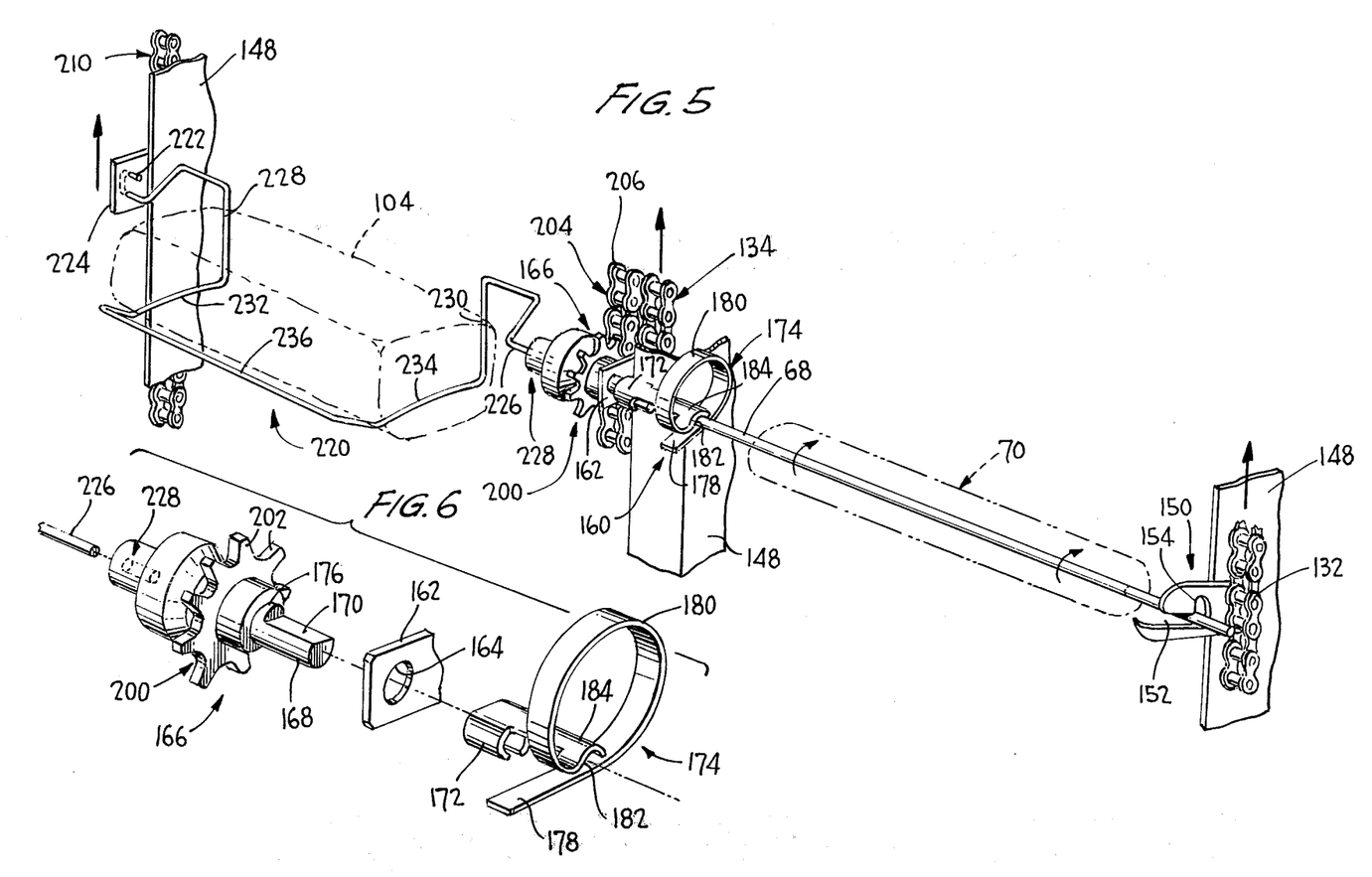
FIG. 5 is an enlarged perspective view showing in detail the arrangement of the various support and conveyor means for a single skewer-supported food article and bun therefor.
FIG. 6 is an exploded fragmentary view of the skewer support means adapted to rotate the skewer and carry one end of the bun support means.

The conveyor chain members 132, 134 are preferably laterally spaced from each other a distance less than the length of a skewer 68 and greater than the length of the food article 70 on the skewer as will be seen particularly in FIG. 5. Any conventional form of guide means or cover plates 148 and supporting brackets 149 may be provided to support the conveyor and heating means and permit access to these means for removal and/or maintenance.

Fixedly secured along the length of the conveyor chain member 132 at spaced locations are a multiplicity of first skewer support means 150 one of which is seen in detail in FIG. 5. The first skewer support means 150 move with the conveyor chain member 132 in the direction of the arrows shown in FIG. 5 and are spaced from each other along the length of the conveyor chain member 132 sufficiently to insure free rotation of each skewer-supported food article without contact with preceding and succeeding articles of a similar nature. Each first skewer support means 150 includes pickup means 152 extending toward the housing means 22 in a slightly upwardly inclined manner to underlie one end of a skewer 68 resting against the flange members 72 of the magazine mean 58 as the first skewer support means 150 passes the feed opening 46. Each first skewer support means 150 also includes bearing means 154 in the form of a slightly vertically elongated slot adapted to receive the end of the skewer 68 from the pickup means 152 and support the same for rotation relative to the first skewer support means 150. the elongated nature of the bearing means 154 permits the end of the skewer 68 to be carried therewithin on the downwardly extending section of the path of travel of the conveyor chain member 132 to insure that it is not accidentally released therefrom, although the end of the skewer 68 will slide free of the bearing means 154 as the conveyor chain member 132 reaches the lower arcuate connecting section.

Laterally aligned with each first skewer support means 150 is a second skewer support means 160. As will be seen particularly in FIGS. 5 and 6, the conveyor chain member 134 has fixedly secured thereto brackets 162 with apertures 164 defined therein. A rotating means 166 includes an elongated stud portion 168 which extends through the aperture 164 and preferably has a flat portion 170 to properly orient attaching means 172 of a flat spring member 174, the attaching means 172 securing the various elements together and causing a continuous portion 176 of the rotating means 166 to rotatably ride within the aperture 164 in the assembled relationship of these elements. Since the spring member 174 is formed of a resilient material, the attaching means 172 can be readily removed from the rotating means 166 for replacement and/or maintenance. The spring member 174 includes a first end portion 178 defining pickup means extending toward the housing means 22 and underlying the other end of a skewer 68 carried by the magazine means 58 as the associated portion of the conveyor chain member 134 passes the feed opening 46. The spring member 174 includes a looped portion 180 connected to the pickup means 178 by a gripping portion 182. The second end portion of the spring member 174 includes further gripping portions 184 biased towards the gripping portion 182 to together define a gripping means for securely holding the end of a skewer 68 to rotate the skewer 68 about its axis in a manner to be described in more detail hereinafter.

Figure 7:
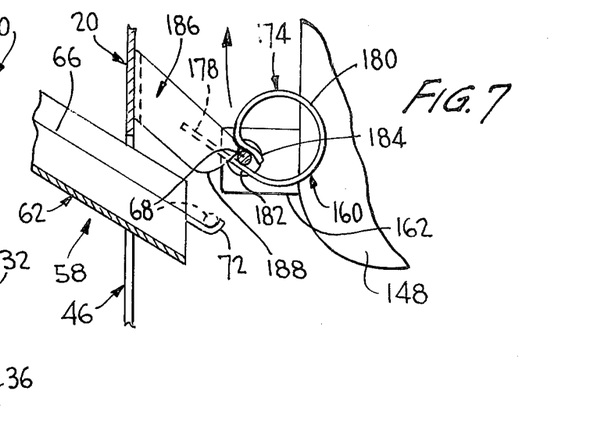
FIG. 7 is a fragmentary side elevational view showing the manner in which the feeding cam means operate to push one end of a skewer into gripping relationship with its associated skewer support means.

Referring now particularly to FIG. 7, it will be seen that a feeding cam means 186 is secured to the housing means 22 immediately above the feed opening 46, the cam means 186 having feeding cam portions 188 which engage the end of a skewer 68 picked up by the pickup means 178 and push the same into gripping relationship with the gripping means defined by the portions 182, 184 as the second skewer support mean 160 passes the feeding cam means 186.

Figure 8:
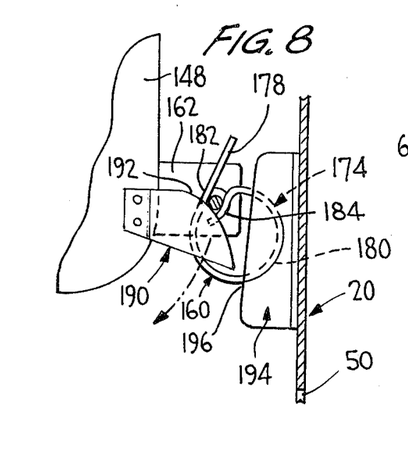
FIG. 8 is a view similar to FIG. 7 showing the manner in which the stripping cam means operates to release the gripped end of the skewer from the skewer support means and align the ends of the skewer for discharge.

By referring to FIG. 8 it will be seen that a stripping cam means 190 is juxtaposed to the discharge opening 50 and includes stripping cam portions 192 which engage the end of the skewer 68 and push the same out of gripping relationship with the gripping means as the second skewer support means 160 passes the stripping cam means 190.

Preferably, guiding means in the form of a pair of guiding members 194 fixedly secured to the housing means 22 immediately before the discharge opening 50 are provided on each side of the discharge opening and have guiding portions 196 which engage the opposite ends of the skewer 68 as it is released by the first and second skewer support means 150, 160 to align the skewer 68 with the discharge opening 50 as it passes the guiding means 194.

The rotating means 166 comprises a sprocket means 200 having a plurality of radially extending teeth members 202, and a stationery timing means in the form of a further chain member 204 including a multiplicity of timing members 206 in the form of the links of the chain member 204, with the teeth members 202 of the sprocket means 200 being operatively associated with the timing members 206 of the timing means 204 to rotate the sprocket means 200 as the conveyor chain member 134 moves along its path of travel. If necessary additional means (not shown) may be provided to insure that the teeth members 202 of the sprocket means 200 are maintained in operative engagement with the links 206 of the chain member 204.

The number of teeth members 202 on the sprocket means 200 is related to the number of timing members 206 on the timing means 204 so as to orient each second skewer support means 160 properly at the points where it picks up and releases the skewer 68. The flattened section 170 on the stud member 168 insures that this relationship is maintained when the spring member 174 is secured by the attaching means 172 to the rotating means 166.

Thus, as the conveyor chain members 132, 134 move about the lower arcuate section of their path of travel, the first and second skewer support means 150, 160 are aligned such that their pickup means 152, 178, respectively, underlie opposite ends of a skewer 68 resting on the flange members 72 of the support portions 64, 66 of the magazine means 58 and lift the skewer-supported food article from the magazine means. At this point, a further skewer-supported food article can be released from engagement with the stop means 74 so as to slide downwardly into position to be picked up by the next pair of first and second skewer support means 150, 160.

As the conveyor chain members 132, 134 pass the feed opening 50, one end of the skewer 68 is engaged by the feeding cam mean 186 as shown in FIG. 7 to push the end of the skewer along the pickup means of the second skewer support means 160 and into gripping relationship with the gripping means defined by the portions 182, 184 of the spring member 174. Simultaneously, the other end of the skewer 68 slides along the length of the pickup means 150 so as to be rotatably supported by the bearing means 154 of the first skewer support means 150.

The skewer-supported food article is rotated by the operative engagement of the teeth members 202 of the sprocket means 200 with the links 206 of the stationery chain member 204 as the conveyor chain members 132, 134 pass through the upwardly extending section, the upper arcuate connecting section, and the downwardly extending section of their paths of travel. As a skewer-supported food article approaches the discharge opening 50, one end of the skewer 68 is engaged by the stripping cam means 190 in the manner seen particularly in FIG. 8 to strip that end of the skewer from the gripping means 182, 184 of the second skewer support means 160 whereby the skewer-supported food article is dispensed through the discharge opening, with the axis of the skewer 68 being aligned parallel to the discharge opening by the guiding means 194.

As the skewer-supported food article travels through its path of travel it is continuously rotated and heated uniformly by the heating means 146.

In the embodiment of the instant invention which incorporates a bun warming section, the bun conveyor means may comprise a further continuous chain member 210 similarly supported by upper and lower sprockets 212, 214, one of which is driven in any conventional manner as by the drive shaft 140 of the motor means 142. A plurality of bun heating means 216, similar to the heating means 146 may be juxtaposed to the bun conveyor means along the bun path.

A plurality of buns support means 220, preferably of a number equal to the number of skewer support means 150 and 160 are provided for movement along the bun path. Reference is made particularly to FIG. 5 for a detailed description of a preferred embodiment of bun support means 220 according to this invention. Each bun support means 220 comprises an elongated wire element having oppositely extending ends, one of which 222 is fixedly secured to an element 224 carried by the bun conveyor chain member 210, and the other of which 226 is rotatably secured within a bearing means 228 secured to the sprocket means 200 and therefore movable with the conveyor chain member 134 which, in this instance, functions simultaneously as part of the skewer-supported food article conveyor means and the bun conveyor means, although it is obvious that a separate conveyor chain member may be utilized for the opposite end portion 226 of the bun support means 220, if desired. Downwardly extending portions 228, 230 are secured to off-set portions connected to the ends 222, 226 of the bun support means 220. Further portions 232, 234 extend substantially at right angles to the lower ends of the downwardly extending portions 228, 230 and are interconnected by a connecting portion 236 which is inclined upwardly and toward the housing means 22 in the position shown in FIG. 5. The portions 228, 230, 232, 234 and 236 together define a concave leading bun support portion during the upwardly extending section of the bun path as seen particularly in FIG. 5. The portion 232, 234 are curved slightly to define a concave trailing bun support portion as will be seen particularly in FIG. 3 during the downwardly extending section of the bun path. Thus, as the bun support members 220 pass from the upwardly extending section to the downwardly extending section about the upper arcuate section of the bun conveyor means, the buns drop from the leading bun support portion of one bun support means onto the trailing bun support portion of the bun support means immediately forward thereof. As the bun support means begin to pass into the lower arcuate connecting section of the bun path as will be seen particularly in FIG. 3, the buns drop from the bun support means 220 onto the tray means 56 and through the discharge opening 52.

The extended nature of the leading bun support portion picks up the buns as they slide free of the bun tray means 100 and, as indicated, the bun stop means 108 can be synchronized to release a bun in sufficient time to reach a bun support means as it passes the feed opening 48.

Figure 4:
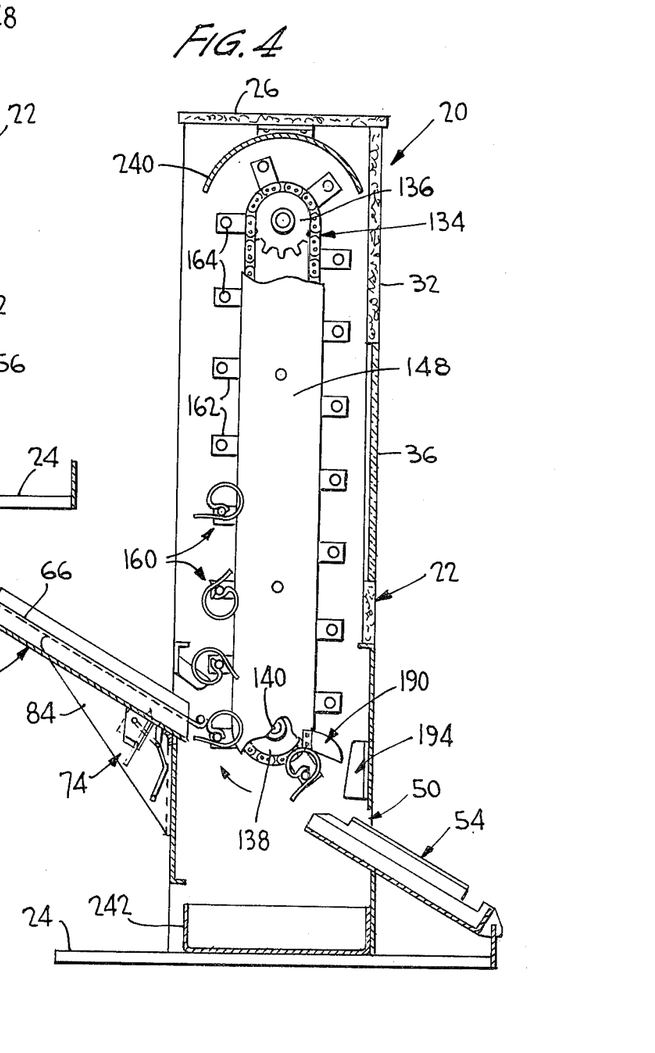
FIG. 4 is a vertical cross-sectional view taken substantially along lines 4—4 of FIG. 2 with the skewer-supported food article magazine means included.

An arcuate shield 240 can be removably secured to the top 26 of the housing means 20 as seen particularly in FIG. 4 to receive any spatters as the skewer-supported food articles pass thereby and a grease pan 242 may be removably positioned within the housing means 22 below the skewer-supported food article section.

The various elements may be readily disassembled as will be understood by those skilled in the art to permit easy maintenance and cleaning of the apparatus for heating and dispensing food articles according to the instant inventive concepts. The use and operation of this apparatus is believed fully understandable from the preceding detailed description. Moreover, it is clear that this detailed description provides an apparatus which satisfies all of the objectives of the instant inventive concepts as set forth above, and others, including many advantages of great practical utility and commercial importance.

The embodiments of the invention in which an exclusive property or privilege is claimed are defined as follows:

1. Apparatus for heating and dispensing food articles including elongated skewer-supported food articles, said apparatus comprising:

housing means including portions defining a feed opening and portions defining a discharge opening; each of said feed and discharge openings being elongated and large enough to receive a skewer-supported food article therethrough;

magazine means including laterally spaced support portions for carrying the opposite ends of at least one skewer adjacent said feed opening;

conveyor means disposed within said housing means and defining as elongated path of travel extending between said feed and discharge openings;

driving means operatively associated with said conveyor means for moving said conveyor means along said path;

heating means juxtaposed to said conveyor means along said path;

said conveyor means including a pair of continuous conveyor means laterally spaced from each other a distance less than the length of a skewer and greater than the length of the food article on a skewer;

at least one first skewer support means carried by one of said conveyor members for movement along said path therewith, said first skewer support means including bearing means for rotatably supporting one end of a skewer, and pickup means extending from said bearing means toward said housing means, said pickup means including portions underlying one end of a skewer carried by said magazine means as said conveyor means passes said feed opening to pickup that end of the skewer and feed it into said bearing means;

second skewer support means laterally aligned with each of said first skewer support means and carried by the other of said conveyor members for movement along said path therewith, each second skewer support means including gripping means for gripping the other end of a skewer in lateral alignment with said bearing means, pickup means extending toward said housing means, said pickup means of said second skewer support means underlying the other end of a skewer carried by said magazine means as said conveyor means passes said feed opening to pickup that end of the skewer, and rotating means for rotating said second skewer support means and thus a skewer gripped by said gripping means about an axis extending between said gripping means and said bearing means as said conveyor means moves along said path;

feeding cam means juxtaposed to said feed opening for pushing the other end of a skewer along said pickup means of said second skewer support means and into gripping relationship with said gripping means; and stripping cam means juxtaposed to said discharge opening for stripping the other end of the skewer from said gripping means of said second skewer support means whereby the skewer-supported food article is dispensed through said discharge opening.

2. The apparatus of claim 1 wherein said magazine means comprises tray means carried by said housing means and extending upwardly and outwardly therefrom, said support portions extending through said feed opening and terminating in upwardly extending flange members adapted to stop the ends of a skewer and support same in position to be picked up by said first and second skewer support means.

3. The apparatus of claim 2 further including adjustment stop means operatively carried by each support portion of said magazine means in spaced relationship to said flange members, said stop means including first stop members selectively extendable through stop openings defined in said support portions of said magazine means to temporarily prevent additional skewer-supported food articles from sliding along said support portions toward said flange members, and means for selectively withdrawing said first stop members through said stop openings to release at least one additional skewer-supported food article.

4. The apparatus of claim 3 wherein each of said stop means includes second stop members selectively extendable through said stop openings in said support portions of said magazine means at a point just behind said first stop members as said first stop members are withdrawn through said stop openings, to thereby release only one additional skewer-supported food article at a time.

5. The apparatus of claim 1 wherein said conveyor means comprises a pair of continuous conveyor chain members, sprocket means rotatably supporting said chain members, and said driving means driving at least one of said sprocket means associated with each chain member.

6. The apparatus of claim 5 wherein said path of travel is a vertically elongated loop.

7. The apparatus of claim 6 wherein said heating means comprises a plurality of vertically spaced heating members within said loop.

8. The apparatus of claim 1 comprising a multiplicity of first and second skewer support means.

9. The apparatus of claim 1 wherein said rotating means comprises a rotatably supported sprocket means having a plurality of radially extending teeth members, and a stationary timing means juxtaposed to said other of said conveyor members and including a multiplicity of timing members, said teeth members of said sprocket means being operatively associated with said timing members of said timing means to rotate said sprocket means as said conveyor means moves along said path.

10. The apparatus of claim 9 wherein said timing means comprises a chain means and said timing members comprise links thereof.

11. The apparatus of claim 9 wherein the number of said teeth members on said sprocket means is related to the number of said timing members on said timing means so as to orient each second skewer support means properly at the points wherein it picks up and releases the skewers.

12. The apparatus of claim 1 wherein said second skewer support means each comprises a spring member including a first end portion defining said pickup means, a looped portion, a gripping portion extending between said looped portion and said first end portion, and a second end portion on the opposite end of said looped portion, said second end portion including further gripping portions biased toward said first-mentioned gripping portion to together define said gripping means.

13. The apparatus of claim 12 wherein said spring member is formed of flat spring material.

14. The apparatus of claim 12 wherein said second end portion further includes attaching means extending in a direction away from said first skewer support means, said attaching means being removably secured to said rotating means in a fixed orientation to rotate said spring member with said rotating means while permitting removal of said spring member from said rotating means for maintenance.

15. The apparatus of claim 1 wherein said feeding cam means comprises a feeding cam member fixedly supported immediately past said feed opening in said path of travel of said conveyor means and having feeding cam portions engaging the other end of a skewer picked up by said pickup means of each second skewer support means and pushing same into gripping relationship with said gripping means as said second skewer support means passes said feeding cam means.

16. The apparatus of claim 1 wherein said stripping cam means comprises a stripping cam member fixedly supported immediately before said discharge opening in said path of travel of said conveyor means and having stripping cam portions engaging the other end of a skewer gripped by said gripping means of each second skewer support means and pushing same out of gripping relationship with said gripping means as said second skewer support means passes said stripping cam means.

17. The apparatus of claim 16 further including guiding means including a guiding member fixedly supported immediately before said discharge opening at each side of same and having guiding portions engaging the ends of each skewer as it is released by said first and second skewer support means to align the skewer with said discharge opening as it passes said guiding means.

18. The apparatus of claim 1 wherein the food articles include, in addition to the skewer-supported food articles, elongated buns for use with the skewer-supported food articles, said apparatus further including, in combination, bun toasting means comprising:

bun feed and discharge openings defined in said housing means;

bun magazine means including support portions carrying at least one bun adjacent said bun feed opening;

bun conveyor means disposed within said housing means and defining a continuous elongated bun path of travel extending between said bun feed and discharge openings, said bun path including an elongated upwardly extending section immediately following passage of said bun feed opening, an elongated downwardly extending section leading past said bun discharge opening, and upper and lower arcuate connecting sections;

driving means operatively associated with said bun conveyor means for moving said bun conveyor means along said bun path;

bun heating means juxtaposed to said bun conveyor means along said bun path;

a plurality of bun support means carried by said bun conveyor means for movement along said bun path therewith, said bun support means each including a leading bun support portion for receiving a bun fed from said magazine means and carrying the same during said upwardly extending section of said bun path, and a trailing bun support portion for receiving a bun dropping from the leading bun support portion of the next succeeding bun support means as said bun support means travels over said upper connecting section and begins said downwardly extending section of said bun path and carrying the same to said bun discharge opening, the bun dropping through said bun discharge opening as said bun support menas begins said lower connecting section of said bun path.

19. The apparatus of claim 18 wherein said bun magazine means comprises bun tray means carried by said housing means and extending upwardly and outwardly therefrom, said bun tray means having a lower end portion extending through said bun feed opening to feed a bun therefrom onto said leading bun support portion of a bun support means as it passes thereby, and bun stop means spaced from said lower end portion of said bun tray means to temporarily prevent additional buns from sliding along said bun tray means toward said lower end portion thereof, and means for selectively withdrawing said bun stop means to release at least one additional bun.

20. The apparatus of claim 19 wherein said bun stop means includes first and second bun stop portions, said second bun stop portions being extended into the path of travel of buns toward said lower end portion of said bun tray means at a point just behind said first stop portions as said first stop portions are withdrawn to thereby release only one additional bun at a time.

21. The apparatus of claim 18 wherein said bun conveyor means includes a further continous bun conveyor member laterally spaced from one of said conveyor members of said skewer-supported food article conveyor means, all of said conveyor members being synchronously driven, said bun support means having opposite end portions secured, respectively, to said one conveyor member of said skewer-supported food article conveyor means, and to said bun conveyor member.

22. The apparatus of claim 21 wherein each of said conveyor means comprises a continuous conveyor chain, sprocket means rotatably supporting said conveyor chains, motor means, and driving shaft members operatively connecting said motor means with at least one sprocket means associated with each conveyor chain.

23. The apparatus of claim 21 wherein one end portion of each bun support means is fixedly secured to said bun conveyor member, and the other end portion thereof is rotatably carried by said one conveyor member of said skewer-supported food article conveyor means.

24. The apparatus of claim 18 wherein each bun support means comprises an elongated wire element having oppositely extending ends secured to said bun conveyor means, first portions extending downwardly substantially at right angles to each of said ends during the upwardly extending section of said bun path, second portions extending substantially at right angles to each of said first portions toward said housing means, and a connecting portion interconnecting said portions and inclined upwardly and toward said housing means relative to said second portions during the upwardly extending section of said bun path, said first, second and connecting portions together defining a concave leading bun support portion during said upwardly extending section of said bun path, and said second portions being arcuate to together define a concave trailing bun support portion during said downwardly extending section of said bun path.

* * * * *